(12) United States Patent
Bai et al.

(10) Patent No.: US 9,237,197 B2
(45) Date of Patent: Jan. 12, 2016

(54) METHOD AND APPARATUS OF USING SEPARATE REVERSE CHANNEL FOR USER INPUT IN MOBILE DEVICE DISPLAY REPLICATION

(71) Applicant: GM GLOBAL TECHNOLOGY OPERATIONS LLC, Detroit, MI (US)

(72) Inventors: Fan Bai, Ann Arbor, MI (US); Robert A. Hrabak, West Bloomfield, MI (US); David P. Pop, Garden City, MI (US); Bo Yu, Warren, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 277 days.

(21) Appl. No.: 13/741,618

(22) Filed: Jan. 15, 2013

(65) Prior Publication Data
US 2014/0201259 A1    Jul. 17, 2014

(51) Int. Cl.
*G06F 15/16* (2006.01)
*H04L 29/08* (2006.01)
*H04L 29/06* (2006.01)

(52) U.S. Cl.
CPC ............ *H04L 67/12* (2013.01); *H04L 65/608* (2013.01); *H04L 67/36* (2013.01)

(58) Field of Classification Search
CPC .............. H04L 29/08072; H04L 29/06; H04L 29/0809; H04L 29/06047; H04L 67/12; H04L 67/36; H04L 65/608; G06Q 30/02
USPC .............. 709/203, 248; 710/62; 370/389, 474
See application file for complete search history.

(56) References Cited

U.S. PATENT DOCUMENTS

| | | | | |
|---|---|---|---|---|
| 2009/0172200 A1* | 7/2009 | Morrison | ............ | G10H 1/0058 709/248 |
| 2010/0208731 A1* | 8/2010 | Hamada | ................. | H04L 67/16 370/389 |
| 2012/0066419 A1* | 3/2012 | Park | .................... | H04M 1/7253 710/62 |
| 2014/0120829 A1* | 5/2014 | Bhamidipati et al. | ....... | 455/3.06 |

* cited by examiner

*Primary Examiner* — Joseph E Avellino
*Assistant Examiner* — Patrick Ngankam

(57) ABSTRACT

A method of controlling media content between a portable device and a head control unit. A first link is initiated for transmitting control signals between a control client and a control server. A second link is initiated for transmitting media content between a data server and a data client. The first link has a lower traffic volume capacity than the second link and a shorter latency for the control signals than for the media content signal over the second link. The control client generates control signals identifying a user's request and transmits the control signals to the control server using the first link. The control server provides instructions to the data server for executing the user request. The retrieved media data is transmitted from the data server to the data client using the second link. The media data is output to the user over the media output device.

24 Claims, 5 Drawing Sheets

METHOD AND APPARATUS OF USING SEPARATE REVERSE CHANNEL FOR USER INPUT IN MOBILE DEVICE DISPLAY REPLICATION

BACKGROUND OF INVENTION

An embodiment relates generally to external device integration within a vehicle.

Mobile devices, such as smart phones, are becoming an everyday part of a person's life. The number of applications that can be used on a smartphone is ever increasing. Such mobile devices are used not only for phone calls and text messaging, but are also used for multimedia, (video and audio), internet access, reading GPS & navigation, scheduling, research, social networking, gaming and literally thousands of other applications. Technologies have recently enabled consumers to use many applications on their phone to be used on a head unit, such directly projecting a video image to the screen in the center stack of the vehicle. With this technique, many users like to display video and other visual or audio material on the screen of the head unit that is generated by the portable device. However, many users desire to use the controls on the head unit to device controls to control the video source as opposed to the controls on the portable device. Data collision between data transmission and control signal transmissions may result in performance and latency issues.

SUMMARY OF INVENTION

An advantage of an embodiment is a reduction in the latency in the performance of the playback of the video or audio generated by a remote device and displayed on a separate output device. The use of separate communication channels or prioritization of communication over a same communication channel eliminates signal collision between the communicating devices. As a result, control signals input by a user to a head control unit are effectively communicated to the remote device, and the commands are immediately executed by the remote device. As a result, there is no latency in the control signals being transmitted to the remote device, or the media data transmission to the head control unit in response to the received control signals.

An embodiment contemplates a method of controlling media content between a source and a remote output device. An autonomous portable multimedia device is adapted to relay media content. The portable device includes a control server, a data server, and a content cache. A head control unit is provided for fixed operation at a viewer seating location. The head control unit includes a control client and a data client. The head control unit includes a media output device for playback of the relayed media content. The head control unit is remote from the portable device. A first local network link is initiated between the control server and the control client for transmitting control signals between the head control unit and the portable device. A second local network link is initiated between the data client and the data server for transmitting media content signals between the head control unit and the portable device. The first local network link has a lower traffic volume capacity than the second local network link and a shorter latency for the control signals than for the media content signal over the second local network link. User input data is received at a head control unit. The user input data relates to a user's request for altering playback of the relayed media content. The control client generates the control signals identifying the user's request and transmits the control signals to the control server using the first local network link. The control server provides instructions to the data server for executing the user request. The data server synchs with the content cache for retrieving media data used to carry out the instructions. The retrieved media data is transmitted from the data server to the data client using the second local network link. The media data is output to the user over the media output device.

DETAILED DESCRIPTION

Figure 1:
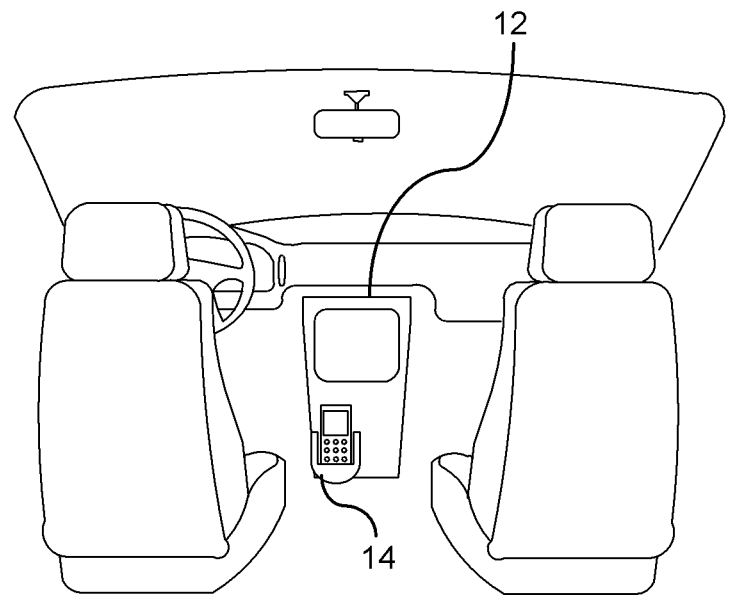
FIG. 1 is a pictorial illustration of a portable device-to-vehicle interface system.
Figure 2:
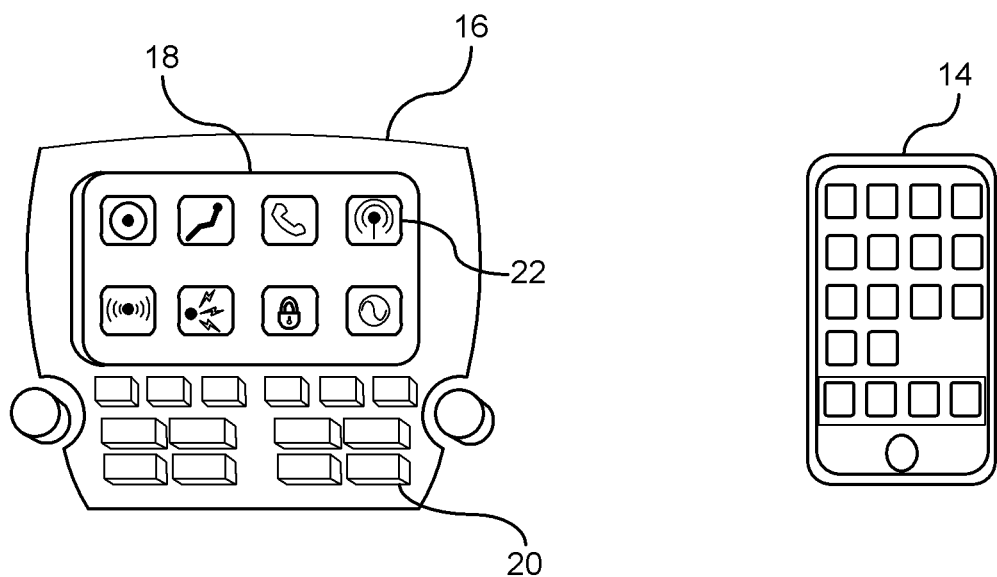
FIG. 2 is a block diagram of a portable device-to-vehicle interface system.

There is shown in FIGS. 1 and 2, a pictorial illustration and a block diagram of a portable device-to-vehicle interface system. The system includes a vehicle interface system 12 that communicates with a portable device 14. The portable device 14 is carried by a user of the vehicle and is capable of storing and executing a plurality of applications that utilize video and audio and is output on the screen of the vehicle interface device 12. Examples of a portable device 14 include, but are not limited to, smartphones, netbooks, e-reader, personal digital assistant (PDA) and any other device capable of running a plurality of video and audio applications. The plurality of video and audio applications includes, but is not limited to, movies, music, DVD, phone, navigation, weather, readers, email and the internet.

The purpose of the portable device-to-vehicle interface system is to allow a user to execute the plurality of video and video applications through the vehicle interface system 12. The vehicle-based interface system 12 includes at least one human machine interface (HMI) device 16. The HMI 16 may have dual functionality where a video screen 18 displays video or other graphics and the HMI 16 also accepts user inputs. An example of an HMI 16 that includes dual functionality is the head unit of a vehicle that includes the video screen 18 for projecting video (e.g., a navigation screen) and dedicated buttons 20 and/or a touch screen 21 for accepting the user's selection. The purpose of the video screen 18 is to display the video that is typically seen on the portable device 14. Video, for the purposes described herein, is any type of image (static or dynamic) that may be projected on the video screen 18. For example, many smart phones today utilize touch screens wherein the graphical user interface is projected on the screen and selections are made by either touching an application/icon on the screen or utilizing a cursor to navigate to the application/icon. In addition, videos such a movie and internet may be projected onto the video screen 18.

The graphical user interface includes, but is not limited to, movies, internet, and graphical icons for selection of software applications.

The HMI 20 projects onto a screen the video or other graphics that would typically be seen on the portable device. This allows the user viewing the projected video to control certain slave software applications via the controls of the interface system 12 as opposed to utilizing the portable device 14. The application from the portable device 14 may be enabled by projecting a menu on a video screen 18 of the HMI 16 for selecting an application. If the video screen 18 is a touch screen 21, then a selection may be made from the touch screen 21, or if the video screen 18 is not a touch screen, then physical controls 20 (buttons, knobs, sticks, etc.) such as those found on the steering wheel may be reconfigured to guide the user through the applications displayed on the screen of the HMI 16.

Figure 3:
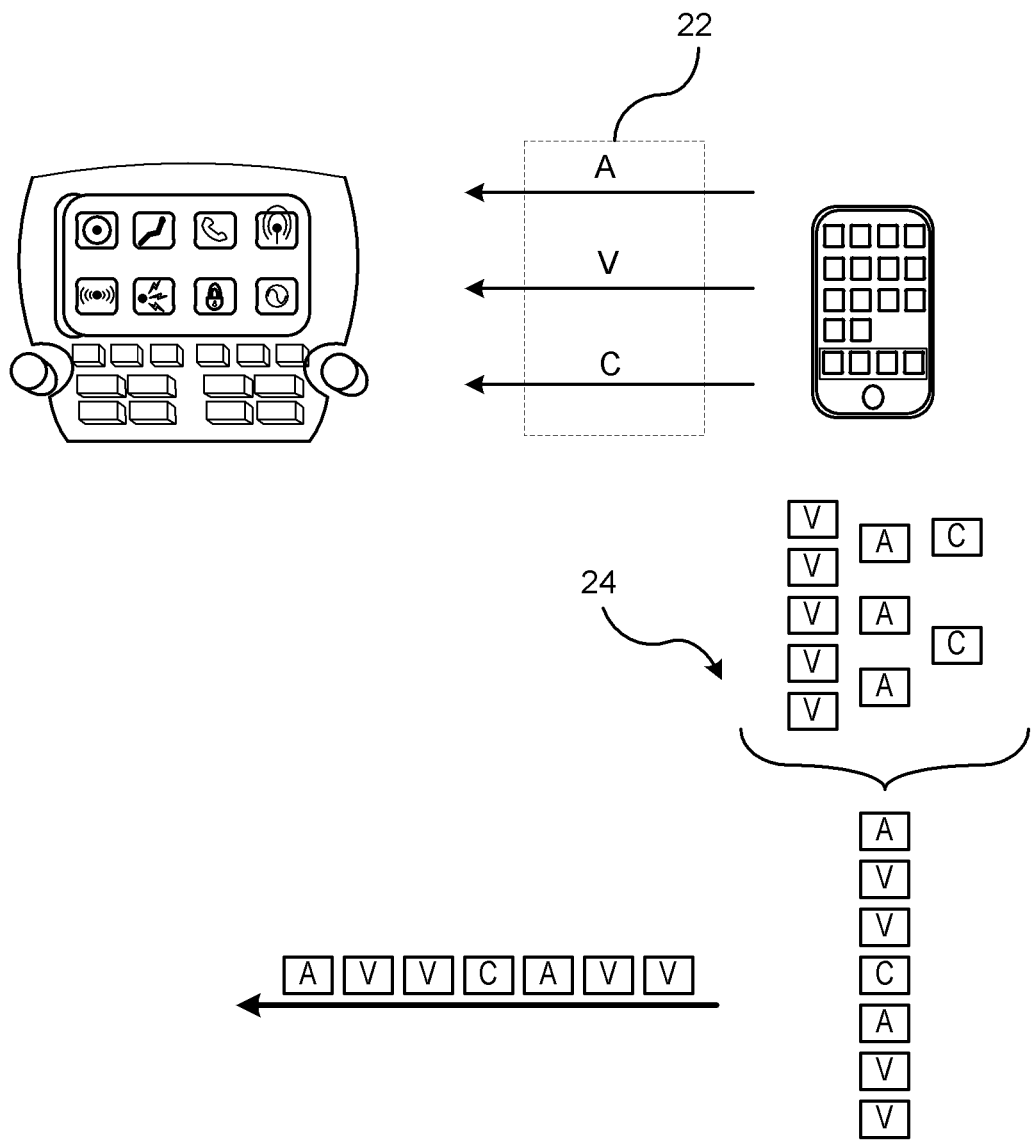
FIG. 3 is a block diagram of a transmission scheme using a single communication channel having all communication in a same direction.

FIG. 3 illustrates an application where data flow and control signals are communicated over a same communication medium. There are three types of data flow: high-volume video flow (V), medium-volume audio flow (A), and low-volume control flow (C). All three volume flows originate from the mobile device to the display device using a WiFi channel 22. Data packets from video, audio and control flow are inserted in a single WiFi queue based on their generation time. As a result, latency experienced by control flow is bounded since the packets from the three flows are sent via weighted round robin process 24.

Figure 4:
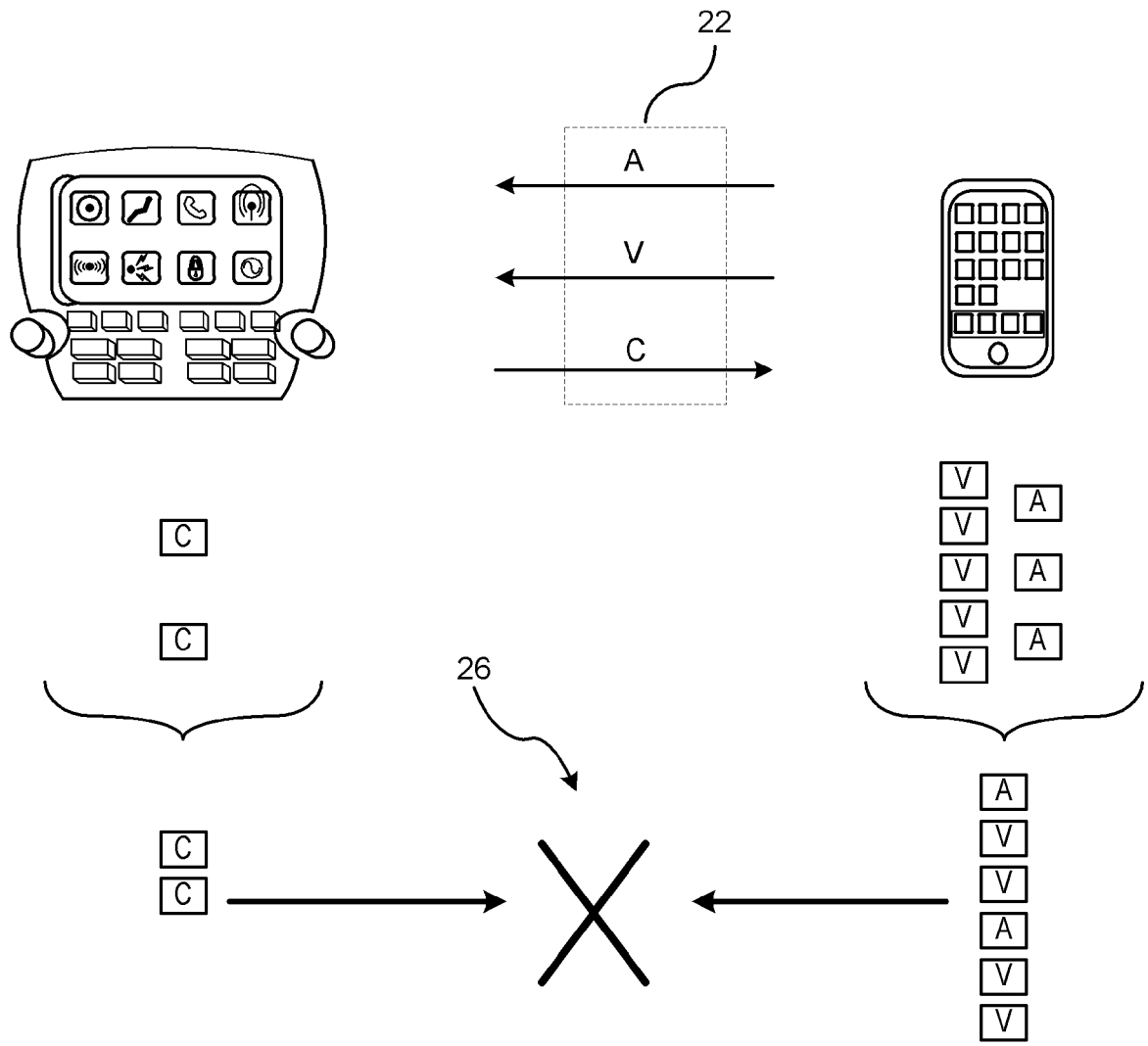
FIG. 4 is a block diagram of a transmission scheme using a single communication channel having communication in opposing directions.

FIG. 4 illustrates another transmission scheme where two UDP ports (A) and (V) could be used for audio and video transmission and one TCP port (C) could be used for control signals on the same WiFi channel 22. The main channel carries the heavy video (V) and audio (A) data thereby dominating the WiFi channel 22 with high utilization. The reverse control flow (C) has little chance to access WiFi channel 22 due to equal back-off mechanism resulting in a long latency for control actions. Collision of data packet and control signal transmission in opposing directions over the same channel occurs as is shown generally at 26. As a result, latency performance is a major concern utilizing this method.

Figure 5:
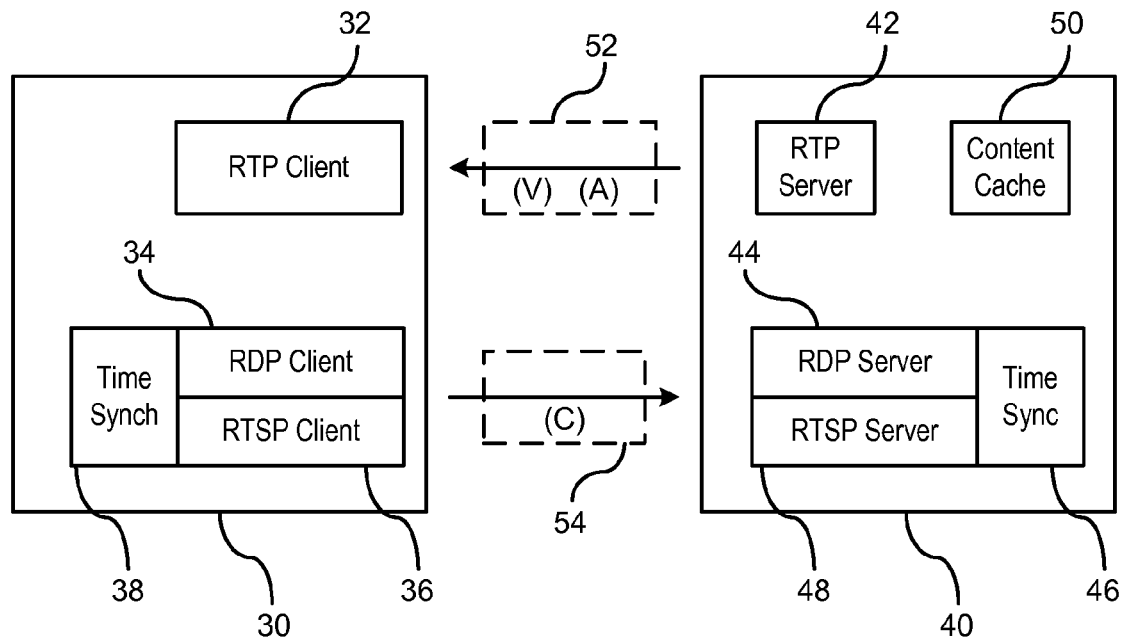
FIG. 5 is a block diagram of a transmission scheme utilizing distinct communication channels.

FIG. 5 illustrates a first transmission scheme for overcoming the deficiencies described above. A client device, such as a vehicle head unit, is illustrated generally at 30. The client device 30 includes a real-time transport protocol (RTP) client 32, a remote desktop protocol (RDP) client 34, a real time streaming protocol (RSTP) client 36, and a time synch module 38 (e.g., a time synch device or a software-based module). The RTP client 32 utilizes a RTP protocol that defines a standardized packet format for transmitting video and audio. RTP which is utilized in communication and entertainment systems utilizing streaming media and other video/audio telecommunications and is primarily designed for end-to-end, real time transfer of the video and audio data.

The RSTP client 36 utilizes a RSTP protocol that defines a network control protocol that is used for entertainment and communication system to control streaming media servers. Delivering the streaming data itself is not a task of the RTSP protocol. Rather the RSTP protocol is used to establish and control the sessions be the end points and control real-time control of playback of the reproduced media. Such commands include, but are not limited to, pause, play, stop, fast forward, and reverse. The RSTP works in conjunction with RTP for streaming media delivery.

The RDP client 34 utilizes a protocol that provides a user with a graphical interface on another viewing device over a network connection. This involves the user utilizing a RDP client protocol on a first communicating device while another communicating device uses a RDP server protocol. The functionality offered by RDP could also be achieved by other protocol components such as virtual network computing (VNC).

The time synch module 38 is used as a timestamp for assisting the client in synchronizing communications and operations with another communicating entity.

A server device, such as a portable device, is illustrated generally at 40. The server device 40 includes a real-time transport protocol (RTP) server 42, a remote desktop protocol (RDP) server 44, a real time streaming protocol (RSTP) server 46, a time synch module 48, and a content cache 50. Each of these respective server devices has similar functionality as described above for the client devices except that the functionality is provided for the server device 40. The content cache 50 stores the video and audio data that is to be delivered from the server device 40 to the client device 30.

In FIG. 5, a WiFi channel 52 is a data communication medium for communicating only video and audio data from the server device 40 to the client device 30. The RTP server 42 communicates with the RTP client 32 for providing the communication protocol for delivering the video and/or audio content from the server device 40 to the client device 30 which can then be displayed on a video screen of the client device 30.

A second communication medium is separate from the WiFi channel 52 is shown generally at 54. The communication medium 54 may include, but is not limited to, Bluetooth, USB, and Near Field Communication. The communication medium 54 is used to transmit control signals that are input by the user to the client device 30. The communication medium delivers the control signals to the server device 40. The control signals provide control actions for controlling the streaming video and/or audio delivered by the server device 30. For example, control signals such as pause, play, rewind, fast forward may be input into the HMI of the server device 30 and control signals are then transmitted over the communication medium 54 for commanding control actions of the server device 40. The RDP client 34, RTSP client 36, and time synch module 38 operate in cooperation to transmit control signals for cooperatively and timely communicating with the RDP server 44, RTSP server 46, and time synch module 48. The RTP server 42 receives the commands from the RDP server 44 and data from the content cache is thereafter communicated from the RTP server 42 to the RTP client 32 for projecting the video and audio over the video screen of the client device.

Figure 6:
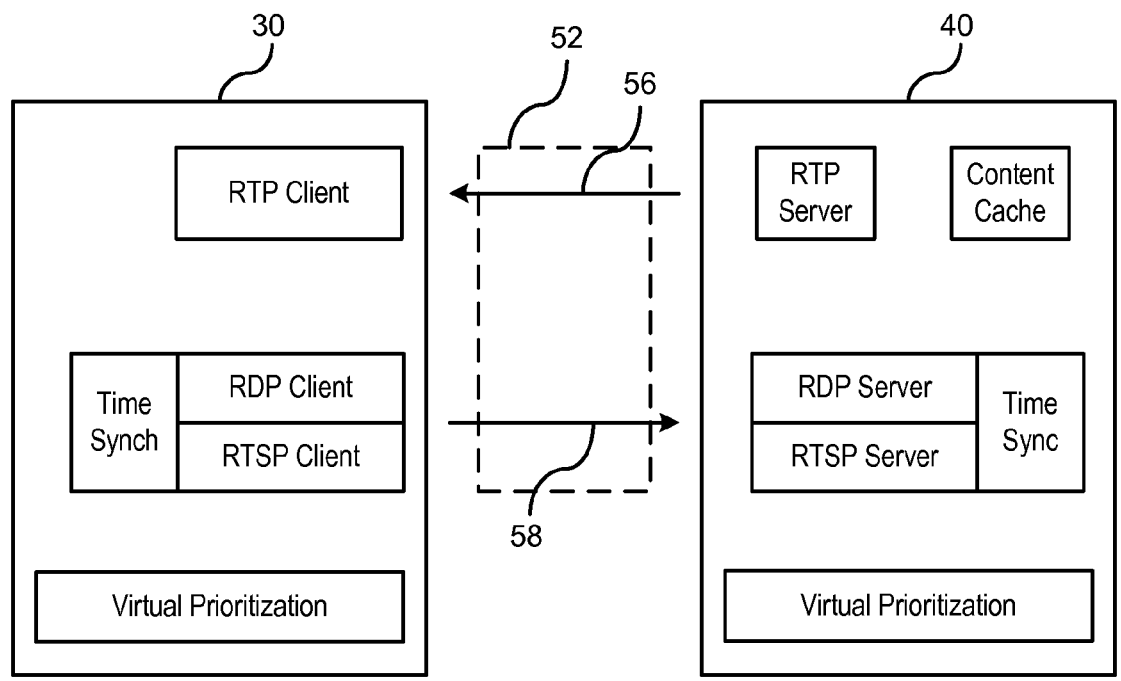
FIG. 6 is a block diagram of a transmission scheme utilizing a prioritized single communication channel.

In FIG. 6, a virtual separation is used on a WiFi channel. Two virtual data streams are used with different prioritizations over a same WiFi channel 52. The client device 30 and the server device 40 utilize the same client devices and server devices, respectively, as described in FIG. 4. The video and audio stream from the server device 40 to the client device 30 operates via a low-priority WiFi broadcast scheme 56. The control signal from the client device 30 to the server device 40 operates via a high-priority WiFi broadcast scheme 58. Prioritization over the WiFi channel may be accomplished utilizing Enhanced Distributed Channel Access (EDCA). In EDCA, high-priority traffic has a higher chance of being sent than low-priority traffic. That is, a data packet with high priority traffic waits a little less before it sends its packet, on average in contrast to data message with low priority traffic. This process is accomplished by using a shorter contention window (CW) and shorter arbitration inter-frame space (AIFS) for higher priority packets. The exact values depend on the physical layer that is used to transmit the data. In addition, EDCA provides contention-free access to the channel for a period called a Transmit Opportunity (TXOP). As a result, the control signal will always have a higher priority than the video or audio data being transmitted since the control signal is communicating the control action that needs to be taken with respect to the video and audio data. Similar functionality of rendering a high-priority channel could also be achieved via using upper layer protocol components, such as transmission control protocol (TCP) variants which manipulates the backoff window of TCP protocols.

Figure 7:
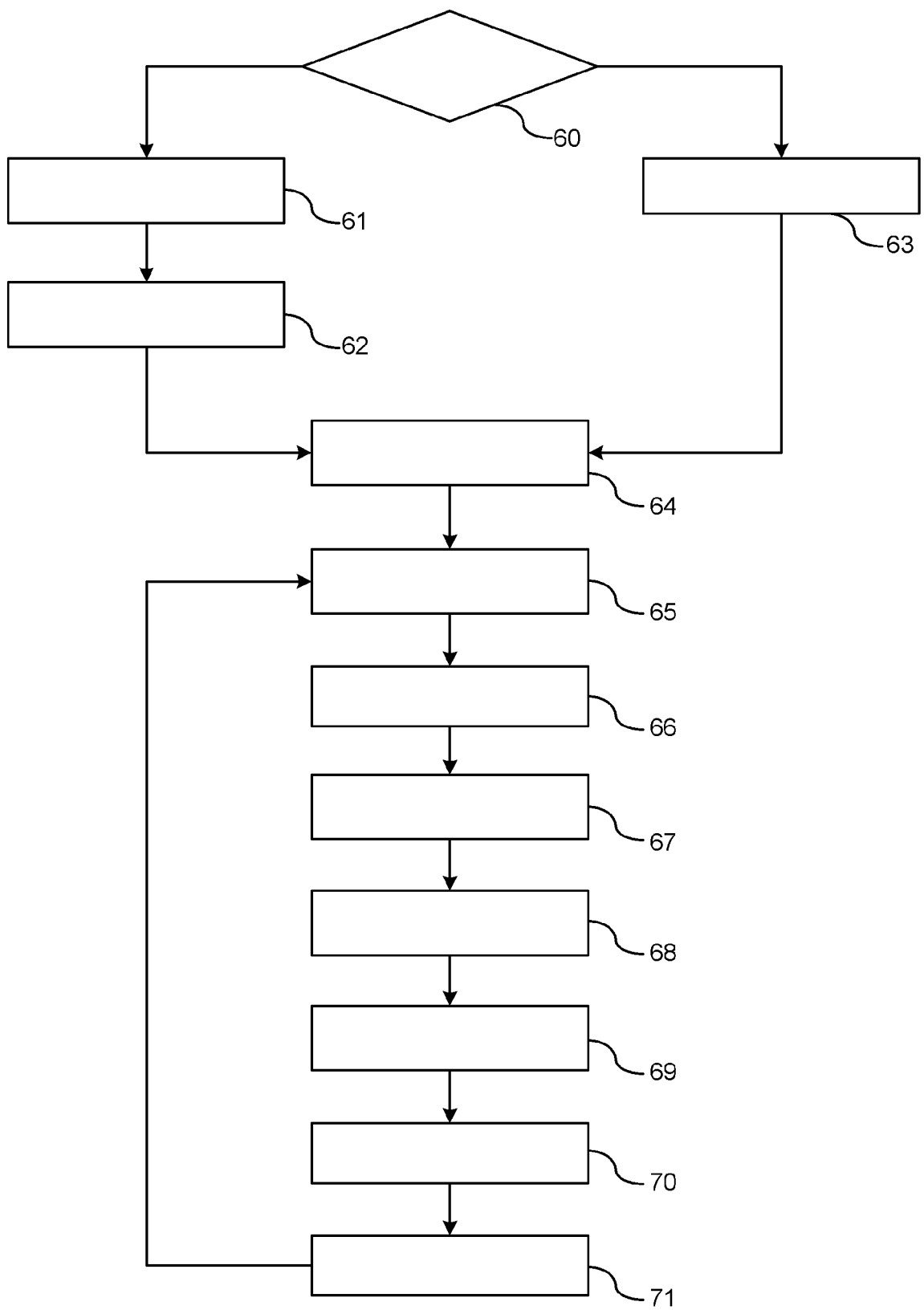
FIG. 7 is a flowchart for a method for the protocol operation between the portable device and the head unit device.

FIG. 7 illustrates a flowchart of the protocol operation between the portable device (i.e., server device) and the head unit device (i.e., client device). In block 60, a determination is made as to which technique to utilize for delivering control signals from the head unit device to the portable device. The determination may be made based on an intelligent system that would decide whether to use separate physical mediums or prioritized communications over a same WiFi channel or may be selected by the user. For example, a determination may be based on the bandwidth of the WiFi channel or other type of interference that would make a respective technique more favorable to use.

In response to a determination that the two separate communication channel techniques should be used, separate communication channels are created in block 61. The video and audio channel may utilize a WiFi communication medium for delivering the video and audio from the portable device to the head unit device. A second communication channel is identified for communicating a control action signal entered by a user on the head control unit to the portable device. Communication mediums used by the second channel may include, but is not limited to, Bluetooth, USB, and NFC.

In block 62, a first local network link and a second local network link are established between the portable device and the head control unit. The first local network link is used for transmitting control signals between the portable device and the head control unit. The second local network link is used for transmitting media content signals between the respective devices. The first local network link has a lower volume capacity than the second local network link and a shorter latency for the control signals than for the media content over the second local network link. Therefore, the first and second local network links may include separate transport entities (as described in block 61) or the first and second local networks may include separate virtual channels on the same transport entity with different priorities (as described in block 63). Both local network links (e.g., communication channels) are synchronized for cooperative communications between the head control unit and the portable device. After synchronization, the routine proceeds to block 64.

In block 64, protocol operations are initiated for delivering and controlling video and audio data from the portable device to the head control unit. The protocol operations described in blocks 64-71 are utilized regardless of whether the two separate communications mediums are utilized or whether the prioritized single WiFi communication technique is utilized. In block 64, the head unit device receives a control action entered by a user. The control action is a request to perform a desired operation of the application that is being or to be delivered from the portable device to the head control unit. A RDP/RTSP action signal that relates to the desired operation is generated. The desired operation for example may include, but is not limited to, start, stop, pause, rewind, and fast forward.

In block 65, the RDP/RSTP client starts/pauses the RTP client operation and retrieves current meta information from the RTP client. The current meta information may include what the current status of the operation is and a timestamp which is used to synchronize events and establish a timing baseline.

In block 66, the RDP/RSTP client communicates the control action over the desired communication medium as determined in block 50 and instructs the RDP/RTSP server of the desired operation along with the status information and timestamp.

In block 67, the RDP/RTSP server forwards the requested desired operation, the status of the operations, and timestamp to the RTP server.

In block 68, the RTP server provides instructions to the content cache as to the desired operation along with timestamp information. The content cache stores all the video and audio data in the portable device.

In block 69, the content cache streams the video and audio data relating to the desired operation to the RTP server.

In block 70, the RTP server transmits via the video and audio WiFi communication medium the video and audio data streamed from the content cache to the RTP Client.

In block 71, the RTP client receives the video and audio data, and the head unit device outputs the video and/or audio on a video screen of the head unit device. A return thereafter is made to block 64.

Referring again to block 60, if the determination is to use the prioritized WiFi channel, then two virtual data pipes with different prioritization are generated on the same WiFi channel. Video and audio data from the RTP server of the portable device is delivered to the head control unit base using a low priority WiFi broadcast scheme. Control signals from the RDP/RTSP client of the head control unit are delivered to the portable device using a high priority WiFi broadcast scheme. As a result, control action signals are provided a higher priority for transmitting data over the WiFi channel in contrast to the transmitting the video and audio data. After the virtual data pipes are created over the same WiFi channel, the routine proceeds to block 64 where protocol operations for transmitting control signals and data are performed.

While certain embodiments of the present invention have been described in detail, those familiar with the art to which this invention relates will recognize various alternative designs and embodiments for practicing the invention as defined by the following claims.

What is claimed is:

1. A method of controlling media content between a source and a remote output device, the method comprising the steps of:
   providing an autonomous portable multimedia device adapted to relay media content, the portable device including a control server, a data server, and a content cache;
   providing a head control unit for fixed operation at a viewer seating location including a control client and a data client, the head control unit including a media output device for playback of the relayed media content, the head control unit being remote from the portable device;
   selecting a communication scheme;
   initiating a first local network link between the control client and the control server for transmitting control signals from a remote desktop client and a real time streaming protocol client of the head control unit to a remote desktop server and a real time streaming server of the portable device;
   initiating a second local network link between the data server and the data client for transmitting media content signals between a real time protocol server of the portable device and a real time protocol client of the head control unit, wherein the first local network link has a lower traffic volume capacity than the second local network link and a shorter latency for the control signals than for the media content signal over the second local network link;

receiving user input data at the head control unit, the user input data relating to a user's request for altering playback of the relayed media content;

the control client generating the control signals identifying the user's request and transmitting them to the control server using the first local network link;

the control server providing instructions to the data server for executing the user request;

synching the data server with the content cache for retrieving media data used to carry out the instructions;

transmitting the retrieved media data from the data server to the data client using the second local network link; and outputting the media data to the user over the media output device.

2. The method of claim 1 wherein the first and second local network links comprise separate transport entities.

3. The method of claim 1 wherein the first and second local network links comprise separate virtual channels on a same transport entity with different priorities.

4. The method of claim 1 wherein the data client includes a real time transport protocol client, the real time transport protocol client receiving the media data over a respective communication channel using the selected communication scheme.

5. The method of claim 4 wherein the control client includes a real time streaming protocol client, the real time streaming protocol client to control media transmission sessions between the portable device and the head control unit using the selected communication scheme.

6. The method of claim 5 wherein the control client includes the remote desktop client providing graphical interface to the head control unit using the selected communication scheme.

7. The method of claim 6 wherein the data server includes a real time transport protocol server, the real time transport protocol server delivering the media data over a respective communication channel using the selected communication scheme.

8. The method of claim 7 wherein the control server includes a real time streaming protocol server, the real time streaming protocol server controlling media transmission sessions between the portable device and the head control unit using the selected communication scheme.

9. The method of claim 8 wherein the control server includes a remote desktop client providing graphical interface to the portable device using the selected communication scheme.

10. The method of claim 9 wherein the head control unit and the portable device each include a time sync module generating time stamps and synchronizing communications between the control client and control server, and generating time stamps and synchronizing communications between the data client and data server.

11. The method of claim 10 wherein the remote desktop client and real time streaming protocol client pauses the real time transport protocol client and retrieves meta information from the real time transport protocol client, wherein the meta information includes current status operation of the real time protocol client and a timestamp for synchronization.

12. The method of claim 11 wherein the remote desktop client and real time streaming protocol client communicates the control action request using the selected communication scheme and instructs the remote desktop server and real time streaming protocol server of the desired operation as requested by the user.

13. The method of claim 12 wherein the remote desktop server and the real time streaming protocol server provides the real time protocol transport server the desired operation, timestamp information, and status information.

14. The method of claim 13 wherein the real time protocol transport server communicates with the content cache for identifying the respective media data affected by the user request.

15. The method of claim 14 wherein the content cache streams the respective media data affected by the user request to the real time protocol transport server.

16. The method of claim 15 wherein the real time protocol transport server transmits the respective media data to the real time protocol client over the respective channel using the selected communication scheme.

17. The method of claim 16 wherein the selected communication scheme uses two one-way communication channels, wherein media data is transmitted from the real time protocol transport server to the real time protocol client over a first communication channel, the first communication channel being a wireless communication channel, and wherein control signals are transmitted from the remote desktop client and the real time streaming protocol client to the remote desktop server and the real time streaming server using a second communication channel that is separate from the first communication channel.

18. The method of claim 17 wherein the second communication channel includes a wireless communication channel.

19. The method of claim 18 wherein the second communication channel includes a wireline communication channel.

20. The method of claim 16 wherein the selected communication scheme uses prioritized communication on a same communication channel wherein communications are prioritized between control signals and data signals.

21. The method of claim 20 wherein messages containing control signals are provided a higher prioritization relative to messages containing media data.

22. The method of claim 21 wherein prioritization over the same communication channel is executed utilizing Enhanced Distributed Channel Access of a wireless communication mechanism.

23. The method of claim 21 wherein prioritization over the same communication channel is executed utilizing an upper layer protocol component.

24. The method of claim 23 wherein the upper layer protocol component includes transmission control protocol variants.

* * * * *